(12) United States Patent
Bridgewater et al.

(10) Patent No.: US 8,005,775 B2
(45) Date of Patent: Aug. 23, 2011

(54) SYSTEM AND METHOD FOR DETECTING HUMAN JUDGMENT DRIFT AND VARIATION CONTROL

(75) Inventors: Jesse Bridgewater, Santa Clara, CA (US); Lawrence Wai, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 783 days.

(21) Appl. No.: 12/050,436

(22) Filed: Mar. 18, 2008

(65) Prior Publication Data

US 2009/0240643 A1     Sep. 24, 2009

(51) Int. Cl.
*G06F 17/00* (2006.01)
*G06N 5/00* (2006.01)

(52) U.S. Cl. ........................................................ 706/45
(58) Field of Classification Search ...................... 706/45
See application file for complete search history.

(56) References Cited

U.S. PATENT DOCUMENTS

| | | | | |
|---|---|---|---|---|
| 3,839,702 | A * | 10/1974 | Chaires et al. | 382/228 |
| 3,842,402 | A * | 10/1974 | Ett et al. | 382/229 |
| 3,988,715 | A * | 10/1976 | Mullan et al. | 382/228 |
| 7,298,885 | B2 * | 11/2007 | Green et al. | 382/133 |
| 7,697,727 | B2 * | 4/2010 | Xu et al. | 382/108 |
| 7,901,933 | B2 * | 3/2011 | Green et al. | 435/287.9 |
| 2006/0276985 | A1 * | 12/2006 | Xu et al. | 702/81 |

OTHER PUBLICATIONS

Unsupervised key-phrases extraction from scientific papers using domain and linguistic knowledge, Krapivin, M.; Marchese, M.; Yadrantsau, A.; Yanchun Liang; Digital Information Management, 2008. ICDIM 2008. Third International Conference on Digital Object Identifier: 10.1109/ICDIM.2008.4746749 Publication Year: 2008 , pp. 105-112.*

Efficacy of a constantly adaptive language modeling technique for web-scale applications, Kuansan Wang; Xiaolong Li; Acoustics, Speech and Signal Processing, 2009. ICASSP 2009. IEEE International Conference on Digital Object Identifier: 10.1109/ICASSP.2009.4960688 Publication Year: 2009 , pp. 4733-4736.*

A Hybrid Strategy for Clustering Data Mining Documents, Yi Peng; Gang Kou; Yong Shi; Zhengxin Chen; Data Mining Workshops, 2006. ICDM Workshops 2006. Sixth IEEE International Conference on Digital Object Identifier: 10.1109/ICDMW.2006.6 Publication Year: 2006 , pp. 838-842.*

Email classification: Solution with back propagation technique, Taiwo Ayodele; Shikun Zhou; Khusainov, R.; Internet Technology and Secured Transactions, 2009. ICITST 2009. International Conference for Publication Year: 2009 , pp. 1-6.*

\* cited by examiner

*Primary Examiner* — Michael B. Holmes
(74) *Attorney, Agent, or Firm* — Seth H. Ostrow; Ostrow Kaufman LLP

(57) ABSTRACT

The present invention relates to methods, systems, and computer readable media comprising instructions for rescaling human judgment data for one or more items of content. The method of the present invention comprises generating one or more test sets comprising one or more items of content and generating one or more benchmark sets comprising one or more items of content common to each of the test sets. Judgment data for the one or more items of content comprising the one or more test sets from one or more human editors is received. A variation correction factor and a drift correction factor are identified for each of the one or more human editors. The variation correction factor and drift correction factor associated with each respective human editor are thereafter applied to the one or more items of content comprising the test set for which each human editor provided judgment data.

15 Claims, 3 Drawing Sheets

SYSTEM AND METHOD FOR DETECTING HUMAN JUDGMENT DRIFT AND VARIATION CONTROL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to judgment drifts and variations in human judgments. More specifically, embodiments of the present invention provide systems, methods and computer program products for detecting judgment drifts and variations among one or more human editors, and utilizing such drifts and variations to identify correction factors for such human editors.

BACKGROUND OF THE INVENTION

Human editors are commonly used to judge various content, including, but not limited to, content responsive to search queries, advertisements responsive to search queries, answers responsive to questions, etc. For example, human editors may be used to identify how relevant a given web page is in response to a query, or how pertinent a given advertisement is to a given search request. Human editors, however, are commonly inconsistent in their judgment of content. Moreover, various human editor may perceive content differently and accordingly judgments regarding such content may vary among human editors. For example, a first given human editor may rate the relevance of a given content item in response to a given search query as "excellent," whereas a second given human editor may rate the relevance of the same content item in response to the same query as "fair." Similarly, a single given human editor may rate a given content item as "highly relevant" in response to a given query on a first given date, however, the same editor may rate the same content item as "not relevant" in response to the same query on a second given date. Accordingly, human editors may not only differ with respect to other human editors regarding judgment of the same or similar content, but a single human editor may also differ with respect to their own prior judgements of a given item of content.

Current techniques for utilizing human editors to judge various content often compute agreement levels among human editors and thereafter discard or ignore human editor judgment data that is inconsistent or conflicting with previous human editor judgment data. For example, current techniques may discard a human editor's judgment of a given content item if the human editor's judgment conflicts with a previous judgment made by the human editor with respect to such content. Similarly, current techniques may discard or ignore a given human editor's judgment from among a pool of human editors' judgments if the given human editor's judgment is different or otherwise contradicts the judgments of the pool of human editors.

Accordingly, while current techniques are capable of utilizing human editor judgments for various content, such techniques fail to consider the entirety of the judgment data generated by such human editors and instead discard or ignore data that may be inconsistent or vary. Thus, there exists a need in the art for identifying drift data and variations among human editors and thereafter ascertaining correction factors for such human editors in order to utilize judgment data generated by human editors with respect to a given set of content.

SUMMARY OF THE INVENTION

The present invention is directed towards systems, methods, and computer readable media comprising program code for rescaling human judgment data for one or more items of content. The method of the present invention comprises generating one or more test sets comprising one or more items of content and generating one or more benchmark sets comprising one or more items of content common to each of the one or more test sets. According to one embodiment of the present invention, generating one or more test sets comprises generating one or more tests comprising one or web pages and one or more queries.

Judgment data for the one or more items of content comprising the one or more test sets from one or more human editors is received. According to one embodiment of the present invention, receiving judgment data for an item of content comprises receiving judgment data indicating a degree to which a given web page is relevant with respect to a given query.

The method of the present invention further comprises identifying a variation correction factor for each of the one or more human editors on the basis of the judgment data received from the one or more human editors for the one or more items of content comprising the benchmark sets. According to one embodiment of the present invention, identifying a variation correction factor comprises identifying a degree to which judgment data provided by a given human editor for a given item of content from a benchmark set differs from the judgment data provided by one or more other human editors for the item of content from the benchmark set.

A drift correction factor for each of the one or more human editors on the basis of historical judgment data associated with the one or more items of content comprising the benchmark sets is thereafter identified. According to one embodiment of the present invention, identifying a drift correction factor comprises identifying a degree to which judgment data provided by a given human editor for a given item of content from a benchmark set differs from prior judgment data provided by one or more human editors for the item of content from the benchmark set.

The method of the present invention further comprises applying the variation correction factor and drift correction factor associated with each respective human editor to the one or more items of content comprising the test set for which each human editor provided judgment data. The application of the variation correction factor and drift correction may comprise applying the variation correction factor and drift correction factor associated with a given human editor to the one or more items of content comprising the test set for which the human editor provided judgment data, and thereafter rescaling the judgment data through use of Monte Carlo techniques.

The present invention is further directed towards systems for rescaling human judgment data for one or more items of content. The system of the present invention comprises a benchmark component operative to generate one or more test sets comprising one or more items of content, and further operative to generate one or more benchmark sets comprising one or more items of content common to each of the one or more test sets. According to one embodiment of the present invention, the benchmark component is operative to generate one or more test sets comprising one or more web pages and one or more queries.

A human editor interface is operative to receive judgment data for the one or more items of content comprising the one or more test sets from one or more human editors. According to one embodiment of the present invention, the human editor interface is operative to receive judgment data from one or more human editors indicating a degree to which a given web page is relevant with respect to a given query.

The system of the present invention further comprises a variation component operative to identify a variation correction factor for each of the one or more human editors on the basis of the judgment data received from the one or more human editors via the human editor interface for the one or more items of content comprising the benchmark sets. The variation component, according to one embodiment of the present invention, is operative to identify a degree to which judgment data provided by a given human editor via the human editor interface for a given item of content from a benchmark set differs from the judgment data provided by one or more other human editors for the item of content from the benchmark set.

A drift component is operative to identify a drift correction factor for each of the one or more human editors on the basis of historical judgment data associated with the one or more items of content comprising the benchmark sets. According to one embodiment of the present invention, the drift component is operative to identify a degree to which judgment data provided by a given human editor via the human editor interface for a given item of content from a benchmark set differs from prior judgment data provided by one or more human editors for the item of content from the benchmark set.

The system of the present invention further comprises a correction factor component operative to apply the variation correction factor and drift correction factor associated with each respective human editor to the one or more items of content comprising the test set for which each human editor provided judgment data. According to one embodiment of the present invention, the correction factor component is operative to apply the variation correction factor and drift correction factors associated with a given human editor to the one or more items of content comprising the test set for which the human editor provided judgment data and thereafter rescale the judgment data through use of Monte Carlo techniques.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
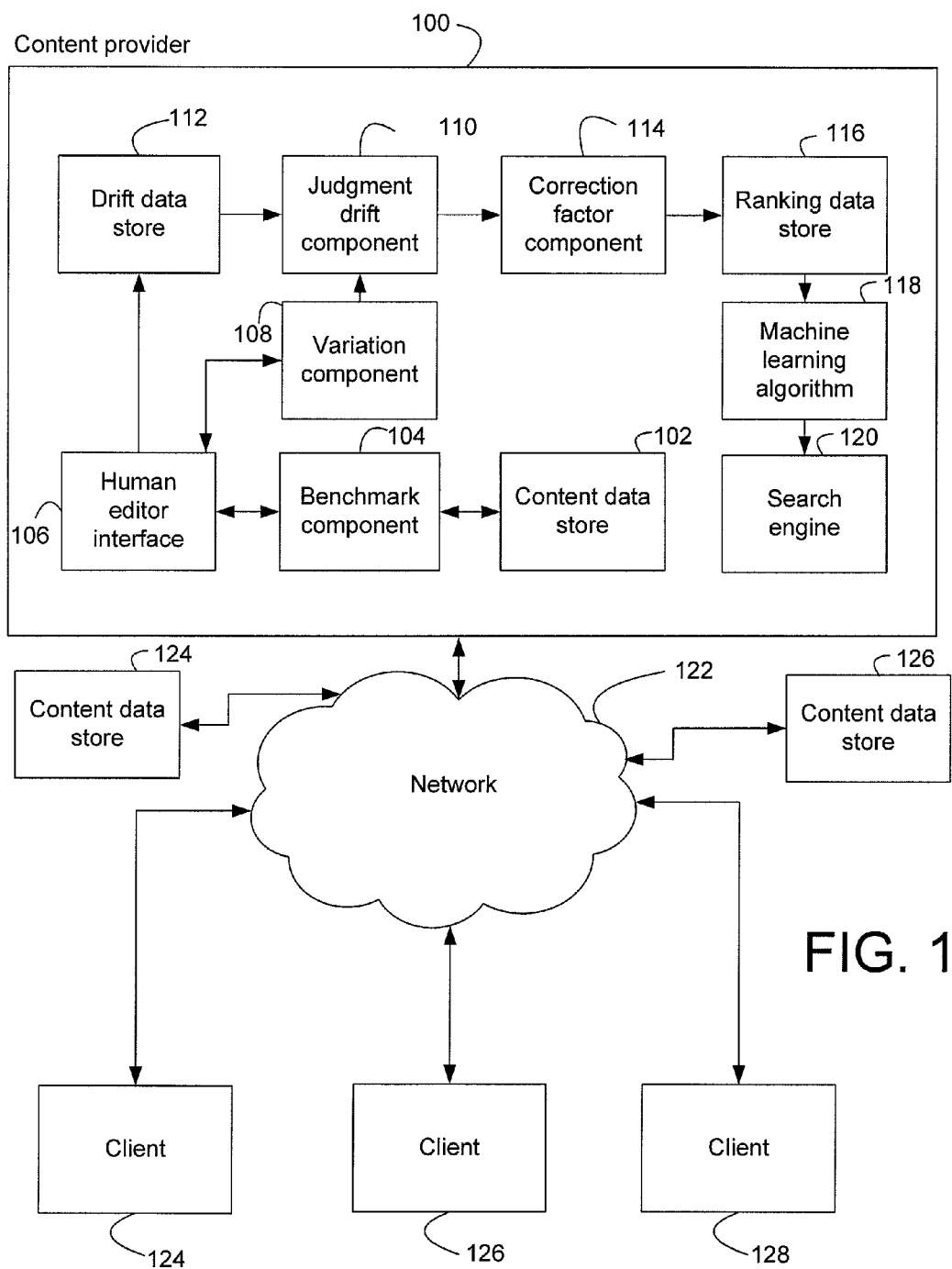
FIG. 1 illustrates a block diagram of a system for detecting judgment drifts and variations among one or more human editors and utilizing such data to identify correction factors for the human editors, according to one embodiment of the present invention.

FIG. 1 illustrates one embodiment of a system for detecting judgment drifts and variations among one or more human editors and utilizing such data to identify correction factors for the one or more human editors. According to the embodiment illustrated in FIG. 1, a content provider 100 may maintain one or more local content data stores 102, which may comprise one or more accessible memory structures such as servers or databases capable of providing for the retrieval and storage of a plurality of content, including, but not limited to, web pages, search queries, advertisements, etc. Additionally, as illustrated in FIG. 1, the content provider may further access one or more remote content data stores 124 and 126, which similarly may comprise one or more accessible memory structures capable of providing for the retrieval and storage of a plurality of content. The content provider may access such remote content data stores 124 and 126 via a network 122, which may comprise any type of computerized network capable of transferring data, including, but not limited to, the Internet.

A benchmark component 104 at the content provider is operative to select a plurality of data from the one or more local 102 or remote 124 and 126 content data stores. The set of data selected by the benchmark component 104 may comprise a variety of data types and amounts of data. For example, the data selected by the benchmark component 104 may comprise a plurality of web pages and one or more queries in response to which the web pages may be relevant. Similarly, the data selected by the benchmark component 104 may comprise a plurality of questions generated by Internet users, as well as answers posted by other Internet users in response to such questions. Further, a the data selected by the benchmark component 104 may comprise a plurality of advertisements and one or more search terms in response to which such advertisements may be relevant.

The benchmark component 104 is further operative to generate a benchmark set, which according to one embodiment of the present invention, comprises a subset of data selected by the benchmark component from the one or more local 102 or remote 124 and 126 content data stores. For example, the data selected by benchmark component 104 from the local content data store 102 may comprise one thousand (1,000) web pages, as well as one or more queries in response to which such web pages may be relevant. Thereafter, the benchmark component 104 may generate a benchmark set comprising ten (10) of the selected web pages.

According to one embodiment of the present invention, the benchmark component 104 thereafter generates one or more sets of data (hereinafter referred to as "test sets") to be displayed to one or more human editors via a human editor interface 106. Each test set of data generated by the benchmark component 104 contains the benchmark set, as well as one or more other items of data selected by the benchmark component 104 from the local 102 or remote 124 and 126 content data stores. Accordingly, each test set contains a common benchmark set. With reference to the abovementioned example, the benchmark component 104 may generate five (5) test sets of data, each of which contains the ten web pages comprising the generated benchmark set, as well as two hundred (200) additional web pages from the data selected by the benchmark component 104 from the local content data store 102.

The test sets generated by the benchmark component 104, which as previously described include the benchmark set and one or more additional items of data, are thereafter displayed to one or more human editors or judges via the human editor interface 106. According to one embodiment of the present invention, the test sets generated by the benchmark component 104 are presented to a plurality of human editors. A given human editor to which a test set is presented may provide various judgments regarding the test set. For example, if presented with a search query and one or more web pages, a human editor may provide judgment regarding the relevance of the one or more web pages in response to the query. Similarly, if presented with an advertisement and one or more web pages, a human editor may provide judgment regarding the degree to which each advertisement is relevant with respect to each web page. According to one embodiment of the present invention, the judgments provided by human editors via the human editor 106 interface are based upon a scale, which may comprise, but is not limited to, a numerical scale.

According to the embodiment illustrated in FIG. 1, the judgments provided by the human editors with respect to the benchmark set are delivered to a drift data store 112. The drift data store 112 may comprise one or more accessible memory structures, such as servers or databases, capable of providing for the retrieval and storage of human editor judgments. The drift data store 112 is operative to maintain a plurality of data regarding judgments made by one or more human editors with respect to one or more items of data in order to ascertain "drifts" or changes in one or more human editors' judgments over time. For example, a given human editor A may provide a rating of "excellent" with respect to a given web page W in response to the query Q. Human editor A's judgment regarding web page W in response to query Q may accordingly be stored in the drift data store and may be used in the future to compare A's judgment regarding web page W in response to query Q to ascertain any potential drift.

The entirety of the judgments provided by the human editors via the human editor interface 106 for the test set, including the benchmark set and the one or more items of additional data comprising the test set to which the benchmark set belongs, are delivered to a variation component 108. The variation component is operative to perform a comparison between the judgments provided by each human editor for the benchmark set common to each test set and ascertain a correction factor for each respective human editor on the basis of the comparison.

For example, the benchmark set common to each test set may comprise pages $P_1$ and $P_2$. Assume a relevance scale of one (1) to ten (10) is used, where "10" is most relevant and "1" is least relevant. Human editor A may have provided a relevance rating of "10" for $P_1$ in response to query Q and a relevance rating of "9" for $P_2$ in response to query Q. Human editor B may also have provided a relevance rating of "10" for $P_1$ in response to query Q and a relevance rating of "9" for $P_2$ in response to query Q. Human editor C, however, may have provided a relevance rating of "9" for $P_1$ in response to query Q and a relevance rating of "8" for $P_2$ in response to query Q. The variation component 108 is operative to perform a comparison of the way in which human editors' judgments may differ. As an example, the variation component 108 may perform a comparison between human editors A, B, and C's judgments with respect to pages $P_1$ and $P_2$ in response to query Q and may determine that human editor C is more conservative when judging relevance of pages in response to queries. Specifically, human editor C's judgments for pages $P_1$ and $P_2$ in response to query Q was one (1) point below the average rating of human editors' A and B with respect to pages $P_1$ and $P_2$ in response to query Q. Accordingly, based upon the comparison, the variation component 108 may determine that human editor C is subject to a correction factor of one (1). The correction factor assigned to a given human editor on the basis of the comparison performed by the variation component 108 with respect to the one or more other human editors is hereinafter referred to as a "variation correction factor."

The variation correction factor for each human editor and the judgments provided by each human editor for the test set are thereafter delivered to a judgment drift component 110. The judgment drift component 110 is operative to perform a comparison between a given judgment made by a human editor with respect to a given content item, and one or more previous judgments made with respect to the same content item. As previously described, the drift data store 112 maintains one or more judgments made by one or more human editors with respect to one or more items of content. Accordingly, the judgment drift component 110 is operative to perform a comparison of the judgment provided by a given human editor with respect to a given item of content and one or more previous judgments made by one or more human editors with respect to the same item of content through use of the data maintained in the drift data store.

According to one embodiment of the present invention, the judgment drift component 110 performs a comparison between current and previous judgments for a given human editor with respect to a given item of data within the benchmark set in order to ascertain the human editor's change in judgment over time. According to another embodiment of the present invention, the judgment drift component 110 performs a comparison between a given human editor's current judgment with respect to a given item of data within the benchmark set, and one or more previous judgments provided by one or more other human editors with respect to the same item of data.

The judgment drift component 110 thereafter generates a correction factor based upon the performed comparison. The correction factor generated by the judgment drift component is hereinafter referred to as a "drift correction factor." According to one embodiment of the present invention, a drift correction factor is generated for a given respective human editor.

The variation correction factors, drift correction factors, and judgments for the test set associated with a given respective human editor are thereafter delivered to a correction factor component 114. According to one embodiment of the present invention, the correction factor component is operative to rescale the judgments provided by a given respective human editor for the items of data comprising the test set presented to a given respective human editor on the basis of the variation and drift correction factors associated with a given human editor.

As previously described, the judgments provided by human editors may be based upon a scale, such as a numerical scale. The drift and variation correction factors, however, may comprise or contain fractional elements. Accordingly, it may be necessary to map the rescaled judgments of the one or more human editors to the original scale used by the human editors to judge the items of data comprising the test set. According to one embodiment of the present invention, Monte Carlo techniques are used to map the rescaled judgments of the one or more human editors to the original scale used by the human editors to judge the one or more items of data comprising the test set.

The rescaled judgments associated with one or more of the items comprising the test set are thereafter delivered to a ranking data store 116, which is operative to maintain the one or more items of content, and may also comprise the rescaled judgments associated with the one or more item of content. The ranking data store 116 may comprise an accessible memory structure, such as a server or database, capable of providing for the retrieval and storage of a plurality of content.

According to the embodiment illustrated in FIG. 1, a machine learning algorithm component 118 is operative to utilize the rescaled data maintained in the ranking data store 116 for one or more machine learning algorithms. For example, as illustrated in FIG. 1, the machine learning algorithm component 118 at the content provider 100 may utilize the rescaled judgment data maintained in the ranking data store 116 to train a search engine 120.

According to another embodiment of the present invention, the search engine 120 at the content provider 100 may utilize the data maintained in the ranking data store 116 in order to identify content responsive to one or more requests received by users of client devices 124, 126, and 128. For example, the search engine 120 at the content provider 100 may receive a query from a given user of a client device 124, 126, and 128. According to one embodiment of the invention, a given client device 124, 126, and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

The search engine 120 may perform a search of the ranking data store 116 to identify content that is most responsive to a given query received from a user of a client device 124, 126, and 128. According to one embodiment of the present invention, the search engine 120 retrieves one or more items of content responsive to a given query from the ranking data store 116 on the basis of the rescaled judgments associated with the one or more items of content.

Figure 2:
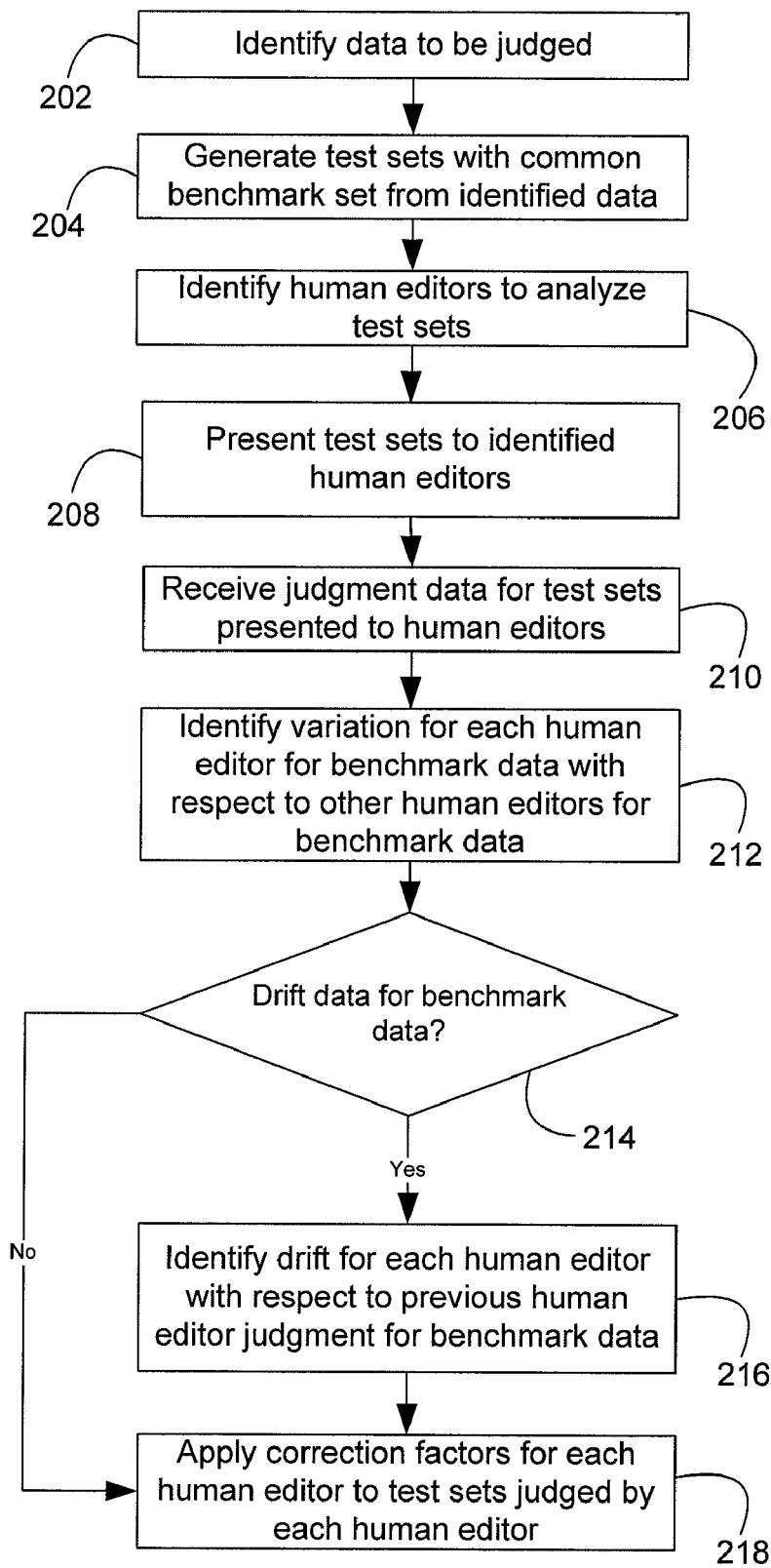
FIG. 2 illustrates a flow diagram presenting a method for receiving judgment data from one or more human editors and generating correction factors for such human editors on the basis of such judgment data, according to one embodiment of the present invention.

FIG. 2 is a flow diagram illustrating one embodiment of a method for receiving judgment data from one or more human editors and generating correction factors for such human editors on the basis of the received judgment data. According to the embodiment illustrated in FIG. 2, data to be judged by one or more human editors is identified, step 202. The data identified in step 202 may comprise any data for which a judgment from a human editor may be provided. For example, the data identified in step 202 may comprise advertisements or web pages, and one or more queries in response to which such advertisements or web pages may be relevant. Similarly, the data identified in step 202 may comprise one or more items on which human editors may vote, such as songs, election candidates, etc. Those of skill in the art recognize the plurality of data that may be selected for which human editors may provide judgment.

As illustrated in FIG. 2, one or more test sets are generated wherein a given test set may include one or more items of common data, which is referred to herein as a "benchmark set." For example, step 204 may comprise generating twenty (20) test sets, a given test set comprising five hundred (500) items of data of which ten (10) items of data comprise the benchmark set. Accordingly, while each of the 20 test sets may contain 490 unique items of data, each test set contains 10 items of data that are common to one or more of the 20 test sets.

One or more human editors are thereafter identified to provide judgment regarding the generated test sets, step 206. The human editors identified in step 206 may comprise any number of human editors. The one or more generated test sets are thereafter presented to the one or more identified human editors, step 208. The human editors may provide judgment regarding a given one of the items comprising the test set. For example, assuming the one or more test sets comprise one or more queries and one or more web pages, a given human editor may provide judgment regarding the relevance of a given web page comprising the test set in response to a given query. According to one embodiment of the present invention, judgment provided by a human editor is based upon a predetermined scale. For instance, in the case of web pages and queries, the scale with which a human editor provides judgment may comprise a numerical scale from one (1) to one hundred (100), or a scale containing the relevance ranks "excellent," "good," "fair," "poor."

The judgment data generated by the one or more human editors for the one or more items of data comprising the one or more test sets is thereafter received, step 210. The variations for the one or more human editor's ranks for the one or more items of data comprising the benchmark set within the test sets ranked by the one or more human editors is thereafter identified, step 212. As previously described, the one or more test sets contain a benchmark set, which comprises data items common to one or more of the test sets. For example, five human editors may be presented with five test sets, a given test set containing one hundred (100) items of data. The test sets presented to the human editors may contain a benchmark set comprising ten (10) items of data, which are common to the given test sets. The five human editors may provide judgment data regarding the 100 items of data comprising the test set presented to a given respective human editor, including the ten items of data comprising the benchmark set. For example, the 100 items of data may comprise web pages and queries. Thus, the judgment data may comprise data regarding the relevance of the 100 web pages in response to the queries. A comparison may be performed with respect to the judgments provided by the five human editors for the ten items comprising the benchmark set.

According to one embodiment of the present invention, an average of the judgment data generated by the one or more human editors is taken for the items of data comprising the benchmark set, and a variation from the calculated average is thereafter identified for a given respective human editor for a given item of data comprising the benchmark set. With reference to the preceding example, an average ranking may be calculated for the relevancy rankings provided by the five editors for the ten web pages comprising the benchmark set. A variation may be identified for a given human editor on the basis of the difference between a given human editor's ranking for a given item in the benchmark set, and the average ranking for the item by the five editors. The variation identified for a given human editor with respect to the one or more other human editors is referred to herein as a variation correction factor.

A check is performed to determine whether any drift data exists for any of the one or more items of data comprising the benchmark set, step 214. According to one embodiment of the present invention, drift data comprises judgment data previously provided by a given human editor. For example, the benchmark set generated in step 204 may contain a web page P and query Q, and accordingly, a human editor identified in step 206 may provide judgment data regarding the relevancy of page P in response to query Q. The check at step 214 may comprise a check to determine whether one or more human editors previously provided judgment data regarding the relevance of page P in response to query Q.

If drift data is detected for the benchmark set, the difference between the previous judgments provided for the benchmark data and the current judgments provided for the benchmark data is identified for a given respective human editor, yielding a drift correction factor for a given respective human editor, step 216. According to one embodiment of the present invention, a drift correction factor comprises the extent to which a given human editor's judgment regarding a given data item differs from the human editor's previous judgments regarding the same data item, or one or more previous judgments regarding the same data item by other human editors.

If no drift data is identified, or after a drift correction factor is identified for the one or more human editors based upon the identified drift data, the variation correction factor and drift correction factors are applied to the one or more test sets for a given respective human editor, step 218. According to one embodiment of the present invention, the drift correction factor and variation correction factor associated with a given human editor is used to rescale the judgments for the one or more items of data comprising the test sets to generate test sets that comprise uniform judgment data. The resealing of the judgments provided by a given human editor for the one or more items of data based upon the drift correction factors and variation correction factors may be performed through use of Monte Carlo techniques, as further described herein.

Figure 3:
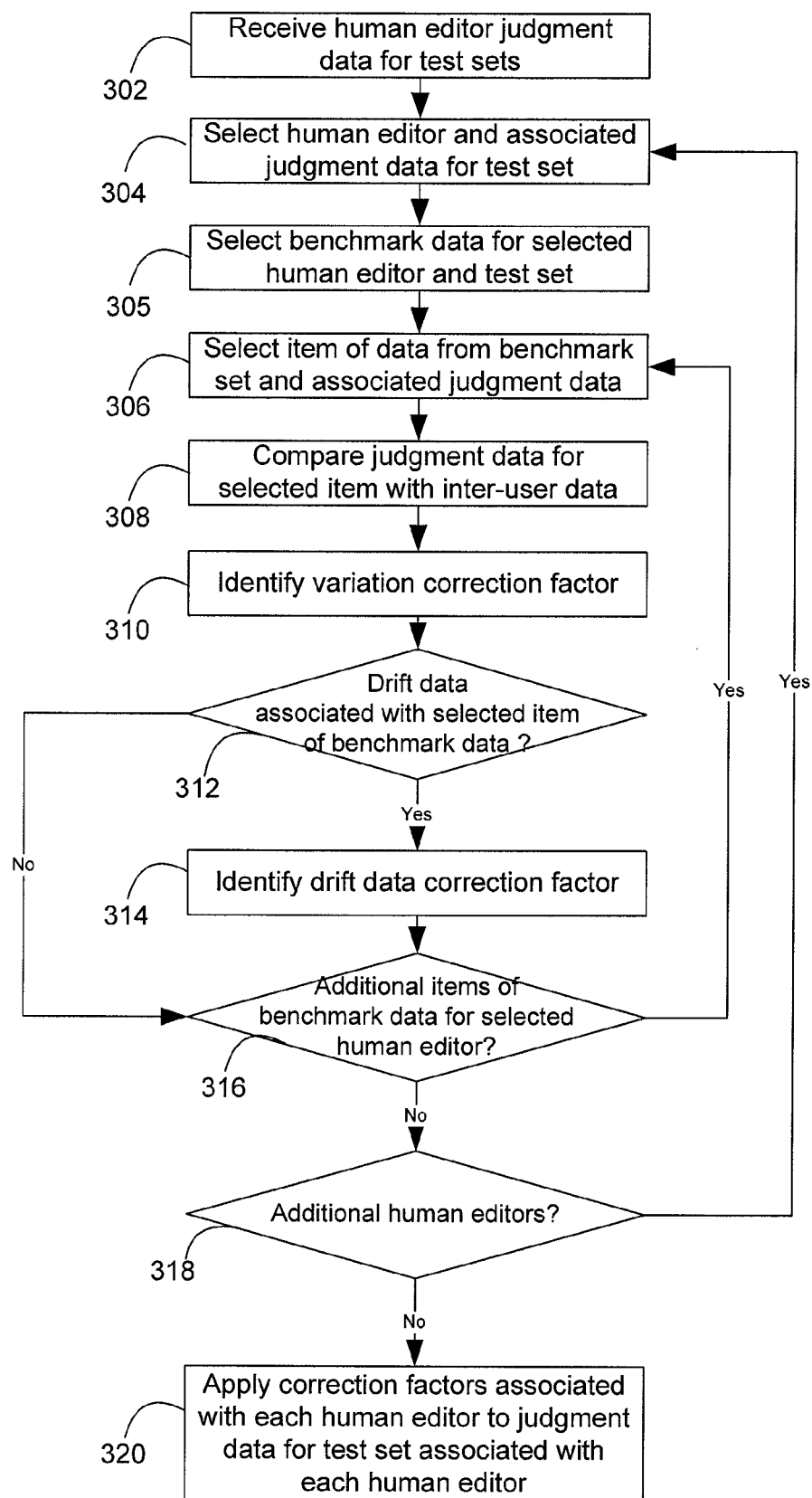
FIG. 3 illustrates a flow diagram presenting a method for generating correction factors for one or more human editors on the basis of drift data and inter-user data, according to one embodiment of the present invention.

FIG. 3 is a flow diagram illustrating one embodiment of a method for generating correction factors for one or more human editors on the basis of drift data and inter-user data, and using such correction factors to rescale one or more judgments made by such human editors regarding one or more items of content. According to the embodiment illustrated in FIG. 3, judgment data from one or more human editors for a one or more test sets of data is received, step 302. As described herein, a given test set of data comprises one or more items of data for which human editors may provide judgment, such as the responsiveness of one or more items of content with respect to one or more queries based upon a numerical relevance scale.

As previously described herein, a given test set further includes a benchmark set of data, wherein a benchmark set of data comprises one or more items of data that are common to one or more test sets of data presented to one or more human editors. Accordingly, a given test set of data comprises one or more items of data, as well as a benchmark set of data. For example, a given test set of data may comprise one thousand (1,000) advertisements, and the benchmark set may comprise one hundred (100) of the 1,000 advertisements. A given human editor may provide judgment data regarding the 1,000 advertisements in the test set, including judgment data for the 100 advertisements comprising the benchmark set. For example, a given human editor may identify the relevance of a given advertisement with respect to a given query on the basis of a relevancy scale, such as a scale from one (1) through ten (10), wherein 10 indicates that a given advertisements is highly relevant with respect to a given query, and 1 indicates that a given advertisement is not relevant with respect to a given query.

A given human editor, as well as the judgment data provided by the human editor for a given test set, is selected from among the one or more human editors that provided the received human editor judgment data, step 304. For example, as previously described, one or more test sets of data, which may include a benchmark set of data, may be presented to one or more human editors. Accordingly, step 304 may comprise selecting a given human editor, as well as the test set presented to the human editor and the judgment data generated by the selected human editor for the test set.

The benchmark data, including the judgment data associated with the benchmark data, is thereafter selected from the test set for which the selected human editor provided judgment data, step 305. For example, the test set presented to the human editor selected in step 304 may comprises one thousand (1,000) web pages and queries. Further, the benchmark set within the test set of 1,000 pages may comprise one hundred (100) web pages and queries. The human editor selected in step 304 may have provided judgment data regarding the relevance of one or more of the 1,000 web pages, including the 100 web pages comprising the benchmark set, with respect to the one or more queries. Accordingly, step 305 may comprise selecting the 100 web pages comprising the benchmark set, as well as the judgment data provided by the selected human editor for the 100 web pages comprising the benchmark set.

A given item of data is selected from among the one or more items of data comprising the benchmark set, including the judgment data associated with the selected item of data provided by the selected human editor, step 306. For example, with reference to the preceding example, a given web page from among the 100 web pages comprising the benchmark set may be selected, as well as the judgment data associated with the web page, which may comprise a query and the human editor's judgment regarding the relevance of the selected web page in response to the query.

A comparison is thereafter performed between the judgment data provided by the human editor for the item of data with respect to the judgment data provided by one or more other human editors, step 308. According to one embodiment of the present invention, a comparison is performed between the judgment data provided by the human editor for the item of data and the inter-user data associated with the selected item of data, wherein inter-user data comprises the judgment data provided by the one or more human editors comprising the pool of human editors from which the human editor was selected in step 304.

With reference to the foregoing example, the judgment data provided by the selected human editor for a web page P and query Q selected from among the 100 web pages comprising the benchmark set may comprise an indication of the relevancy of the web page P in response to the query Q based upon on a scale from one (1) (not relevant) through ten (10) (highly relevant). The human editor may indicate that relevance of web page P in response to the query Q is the value "10," thus indicating that web page P is highly relevant with respect to query Q. Accordingly, a comparison may be performed with respect to the human editor's judgment, and one or more of the human editors comprising the pool of human editors from which the human editor was selected in step 304. For example, a comparison may be performed between the average relevance score provided by the one or more human editors comprising the pool of human editors regarding the relevance of web page P in response to the query Q and the value "10" provided by the selected human editor regarding the relevance of web page P in response to the query Q. Alternatively, or in conjunction with the foregoing, a comparison may be performed using a given human editor from the one or more human editors comprising the pool of human editors who is identified as a reliable or trustworthy human editor. For example, a given editor from among the one or more human editors comprising the pool of human editors may be identified as a human editor who is more trustworthy or whose judgment is considered more reliable. Accordingly, the value "10" provided by the selected human editor for the relevance of web page P in response to the query Q may be compared with the value provided by a given human editor who is identified as trustworthy or reliable.

The comparison between the judgment data provided by the selected human editor for the item of selected data from the benchmark set is used to generate a variation correction factor, step 310. According to one embodiment of the present invention, a variation correction factor comprises a value indicating the extent to which a given human editor's judgment regarding a given item of data from the benchmark set varies or deviates from the one or more human editors comprising the pool of human editors for the item of data. For example, a variation correction factor may comprise a value indicating the extent to which a given human editor's judgment regarding a given item of data from the benchmark set varies or deviates from the average human editor's judgment regarding the item of data. According to another embodiment of the present invention, and as discussed above, a variation correction factor comprises a value indicating the extent to which a given human editor's judgment regarding a given item of data from the benchmark set varies or deviates from a given human editor identified as trustworthy or reliable. Those of skill in the art recognize the plurality of comparisons that may be performed to identify the variation of a given human editor's judgment regarding a given item of data from a benchmark set with respect to the judgment of one or more other human editors regarding the item of data from the benchmark set.

According to the embodiment illustrated in FIG. 3, a check is thereafter performed to determine whether any drift data exists for the given item of data from the benchmark set, step 312. Drift data may comprise judgment data previously provided for a given item of data by one or more human editors. For example, with reference to the foregoing example, the human editor selected at step 304 may have provided judgment regarding the relevancy of page P with respect to query Q on several occasions. The judgment data regarding the relevancy of page P with respect to query Q provided by the selected human editor on one or more previous occasions may comprise drift data. Alternatively, or in conjunction with the foregoing, drift data may further comprise judgment data provided by one or more human editors other than the human editor selected at step 304 for a given item of data from a benchmark set. For example, with reference to the preceding example, one or more human editors other than the human editor selected at step 304 may have previously provided judgment regarding the relevancy of page P with respect to query Q on several occasions. The judgment data regarding the relevancy of page P with respect to query Q previously provided by the one or more other human editors may comprise drift data.

If drift data is detected for the selected item of data from the benchmark set, the identified drift data is retrieved and used to generate a drift correction factor for the selected human editor, step 314. According to one embodiment of the present invention, a drift correction factor for a given human editor comprises an indication of the degree to which the human editor's judgment for a given item of data varies or deviates from one or more previous judgments regarding the item of data provided by one or more human editors.

If no drift data is identified for the item of data selected from the benchmark set, or after the drift data correction factor has been identified for the item of data selected from the benchmark set for the selected human editor, a check is performed to determine whether one or more additional items of benchmark data require analysis for the selected human editor, step 316. If one or more additional items of benchmark data require analysis for the selected human editor, a next item of data is selected from among the one or more items of data comprising the benchmark set, step 306.

If there are no additional items of benchmark data that require analysis for the selected human editor, a check is performed to determine whether one or more additional human editors require analysis, step 318. For example, the check performed at step 318 may comprise a check to determine whether one or more human editors have provided judgment data regarding the benchmark set of data. If one or more additional human editors require analysis, a next human editor is selected from among the pool of one or more human editors, step 304.

After an analysis has been performed with respect to the one or more human editors, the foregoing variation correction factors and drift correction factors are applied to the test set for which a given respective human editor provided judgment data, step 320. According to one embodiment of the present invention, application of the variation correction factors and drift correction factors associated with the one or more human editors is performed through use of Monte Carlo techniques. For example, as previously described, the test set may comprise one or more web pages for which a given human editor provides an indication of the relevancy of respective web pages with respect to one or more queries. The indication provided by the human editor may comprise a numerical value selected from a scale of one (1) (least relevant) to ten (10) (most relevant). The human editor may provide values for the one or more web pages comprising the test set. The variation and drift correction factors associated with the human editor may comprise the values 0.5 and 0.3, respectively, which may yield a cumulative correction factor of 0.8. Accordingly, the human editor's judgments regarding the web pages comprising the test set may need to be rescaled based upon the variation and correction factors.

The rescaling of the human editor's judgments regarding the web pages based upon the correction factors, however, may yield fractional values, as the original scale with which the human editor indicated the relevancy of a respective web page was based upon whole numbers (i.e., the abovementioned 1 through 10 relevancy scale). Accordingly, through use of Monte Carlo techniques, the judgments provided by the human editor may be rescaled, and Monte Carlo techniques may be used to map the rescaled judgment data to the original scale with which the human editor indicated the relevancy of a respective web page and to ensure that the test set of data contains the proper distribution of judgments.

The rescaled judgment data may thereafter be used for a variety of purposes, including but not limited to, as input to one or more machine learning algorithms. For example, as previously described, the judgment data generated by the human editors may pertain to the relevancy of one or more web pages in response to one or more queries. Accordingly, the rescaled judgment data may be used by a machine learning algorithm to identify one or more characteristics of the web pages and queries in order to train a search engine to increase the likelihood with which the search engine retrieves web pages in response to a given query. Those of skill in the art recognize the plurality of machine learning algorithms that may use the rescaled judgment data.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for rescaling human judgment data for one or more items of content, the method comprising:
   generating one or more test sets comprising one or more items of content the one or more items of content including one or more web pages and one or more queries;
   generating one or more benchmark sets comprising one or more items of content common to each of the one or more test sets;
   receiving judgment data for the one or more items of content comprising the one or more test sets from one or more human editors;
   identifying a variation correction factor for each of the one or more human editors on the basis of the judgment data received from the one or more human editors for the one or more items of content comprising the benchmark sets;
   identifying a drift correction factor for each of the one or more human editors on the basis of historical judgment data associated with the one or more items of content comprising the benchmark sets; and
   applying the variation correction factor and drift correction factor associated with each respective human editor to the one or more items of content comprising the one or more test sets for which each human editor provided judgment data.

2. The method of claim 1 wherein receiving judgment data for an item of content comprises receiving judgment data indicating a degree to which a given web page is relevant with respect to a given query.

3. The method of claim 1 wherein identifying a variation correction factor comprises identifying a degree to which judgment data provided by a given human editor for a given item of content from a benchmark set differs from the judgment data provided by one or more other human editors for the given item of content from the benchmark set.

4. The method of claim 1 wherein identifying a drift correction factor comprises identifying a degree to which judgment data provided by a given human editor for a given item of content from a benchmark set differs from prior judgment data provided by one or more human editors for the given item of content from the benchmark set.

5. The method of claim 1 wherein applying the variation correction factor and drift correction factor comprises:
   applying the variation correction factor and drift correction factor associated with a given human editor to the one or more items of content comprising the one or more test sets for which the human editor provided judgment data; and
   rescaling the judgment data through use of Monte Carlo techniques.

6. A system for rescaling human judgment data for one or more items of content, the system comprising:
   a benchmark component operative to:

generate one or more test sets comprising one or more items of content, the one or more items of content including one or more web pages and one or more queries; and generate one or more benchmark sets comprising one or more items of content common to each of the one or more test sets;

a human editor interface operative to receive judgment data for the one or more items of content comprising the one or more test sets from one or more human editors;

a variation component operative to identify a variation correction factor for each of the one or more human editors on the basis of the judgment data received from the one or more human editors via the human editor interface for the one or more items of content comprising the benchmark sets;

a drift component operative to identify a drift correction factor for each of the one or more human editors on the basis of historical judgment data associated with the one or more items of content comprising the benchmark sets; and a correction factor component operative to apply the variation correction factor and drift correction factor associated with each respective human editor to the one or more items of content comprising the one or more test sets for which each human editor provided judgment data.

7. The system of claim 6 wherein the human editor interface is operative to receive judgment data from one or more human editors indicating a degree to which a given web page is relevant with respect to a given query.

8. The system of claim 6 wherein the variation component is operative to identify a degree to which judgment data provided by a given human editor via the human editor interface for a given item of content from a benchmark set differs from the judgment data provided by one or more other human editors for the given item of content from the benchmark set.

9. The system of claim 6 wherein the drift component is operative to identify a degree to which judgment data provided by a given human editor via the human editor interface for a given item of content from a benchmark set differs from prior judgment data provided by one or more human editors for the given item of content from the benchmark set.

10. The system of claim 6 wherein the correction factor component is operative to:

apply the variation correction factor and drift correction factors associated with a given human editor to the one or more items of content comprising the one or more test sets for which the human editor provided judgment data; and rescale the judgment data through use of Monte Carlo techniques.

11. A computer readable media comprising program code that when executed instructs a processor to perform a method for rescaling human judgment data for one or more items of content, the method comprising:

instructions for generating one or more test sets comprising one or more items of content, the one or more items of content including one or more web pages and one or more queries;

instructions for generating one or more benchmark sets comprising one or more items of content common to each of the one or more test sets;

instructions for receiving judgment data for the one or more items of content comprising the one or more test sets from one or more human editors;

instructions for identifying a variation correction factor for each of the one or more human editors on the basis of the judgment data received from the one or more human editors for the one or more items of content comprising the benchmark sets;

instructions for identifying a drift correction factor for each of the one or more human editors on the basis of historical judgment data associated with the one or more items of content comprising the benchmark sets; and instructions for applying the variation correction factor and drift correction factor associated with each respective human editor to the one or more items of content comprising the one or more test sets for which each human editor provided judgment data.

12. The computer readable media of claim 11 wherein the instructions for receiving judgment data for an item of content comprises instructions for receiving judgment data indicating a degree to which a given web page is relevant with respect to a given query.

13. The computer readable media of claim 11 wherein the instructions for identifying a variation correction factor comprises instructions for identifying a degree to which judgment data provided by a given human editor for a given item of content from a benchmark set differs from the judgment data provided by one or more other human editors for the given item of content from the benchmark set.

14. The computer readable media of claim 11 wherein the instructions for identifying a drift correction factor comprises instructions for identifying a degree to which judgment data provided by a given human editor for a given item of content from a benchmark set differs from prior judgment data provided by one or more human editors for the given item of content from the benchmark set.

15. The computer readable media of claim 11 wherein the instructions for applying the variation correction factor and drift correction factor comprises:

instructions for applying the variation correction factor and drift correction factor associated with a given human editor to the one or more items of content comprising the one or more test sets for which the human editor provided judgment data; and instructions for rescaling the judgment data through use of Monte Carlo techniques.

* * * * *